United States Patent
Azar et al.

(10) Patent No.: US 11,362,550 B2
(45) Date of Patent: Jun. 14, 2022

(54) ELECTRICAL MACHINE WITH HYBRID TOOTH DESIGN

(71) Applicant: Siemens Gamesa Renewable Energy A/S, Brande (DK)

(72) Inventors: Ziad Azar, Sheffield (GB); Alexander Duke, Sheffield (GB)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 130 days.

(21) Appl. No.: 16/656,100

(22) Filed: Oct. 17, 2019

(65) Prior Publication Data

US 2020/0136441 A1 Apr. 30, 2020

(30) Foreign Application Priority Data

Oct. 30, 2018 (EP) .................................... 18203383

(51) Int. Cl.
*H02K 1/16* (2006.01)
*H02K 1/18* (2006.01)
(Continued)

(52) U.S. Cl.
CPC ............. *H02K 1/165* (2013.01); *H02K 1/187* (2013.01); *H02K 1/265* (2013.01); *H02K 3/28* (2013.01); *H02K 1/148* (2013.01)

(58) Field of Classification Search
CPC .......... H02K 1/165; H02K 1/187; H02K 3/28; H02K 7/183; H02K 2213/12; H02K 1/265; H02K 1/148; Y02E 10/72
(Continued)

(56) References Cited

U.S. PATENT DOCUMENTS

| 6,265,804 B1 | 7/2001 | Nitta et al. |
| 7,990,014 B2 * | 8/2011 | Clark ..................... H02K 1/165 |
| | | 310/216.069 |

(Continued)

FOREIGN PATENT DOCUMENTS

| CN | 1889338 A | 1/2007 |
| CN | 101523695 A | 9/2009 |

(Continued)

OTHER PUBLICATIONS

European Search Report dated Apr. 10, 2019 for Application No. 18203383.7.

(Continued)

*Primary Examiner* — Ahmed Elnakib
(74) *Attorney, Agent, or Firm* — Schmeiser, Olsen & Watts LLP

(57) ABSTRACT

Provided is a stator segment for the stator or the rotor of an electrical machine including a segment body circumferentially extending about a longitudinal axis of the stator segment between two circumferential ends. The segment body includes: a plurality of teeth protruding according to a radial direction orthogonal to the longitudinal axis, each tooth circumferentially extending between two respective side faces, the teeth being circumferentially distributed between two end teeth of the teeth, the teeth including at least one intermediate tooth circumferentially included between the end teeth, a plurality of slots, the plurality of slots including a plurality of intermediate slots circumferentially included between the two end slots, wherein side faces of the two end teeth are inclined with or parallel to each other and the side faces of the at least one intermediate tooth are respectively parallel to each other or inclined with respect to each other.

5 Claims, 3 Drawing Sheets

(51) Int. Cl.
*H02K 3/28* (2006.01)
*H02K 1/26* (2006.01)
*H02K 1/14* (2006.01)

(58) Field of Classification Search
USPC .................................................. 310/216.69
See application file for complete search history.

(56) References Cited

U.S. PATENT DOCUMENTS

| | | | |
|---|---|---|---|
| 8,487,502 B2 | 7/2013 | Kaiser et al. | |
| 2005/0099086 A1* | 5/2005 | Schunk | H02K 1/146 |
| | | | 310/216.069 |
| 2007/0096580 A1* | 5/2007 | Ketteler | H02K 3/28 |
| | | | 310/179 |
| 2010/0253176 A1 | 10/2010 | Ovrebo et al. | |
| 2014/0346919 A1* | 11/2014 | Wu | H02K 1/265 |
| | | | 310/216.069 |
| 2015/0137652 A1 | 5/2015 | Petter et al. | |
| 2018/0123407 A1 | 5/2018 | Flynn | |

FOREIGN PATENT DOCUMENTS

| | | |
|---|---|---|
| CN | 102856991 A | 1/2013 |
| CN | 105406629 A | 3/2016 |
| EP | 2922177 A1 | 9/2015 |
| WO | 2015044949 A2 | 4/2015 |
| WO | WO 2015044949 A2 | 4/2015 |
| WO | 2017101637 A1 | 6/2017 |

OTHER PUBLICATIONS

Chinese Office Action dated Sep. 15, 2021 for Application No. 201911044674.0.

* cited by examiner

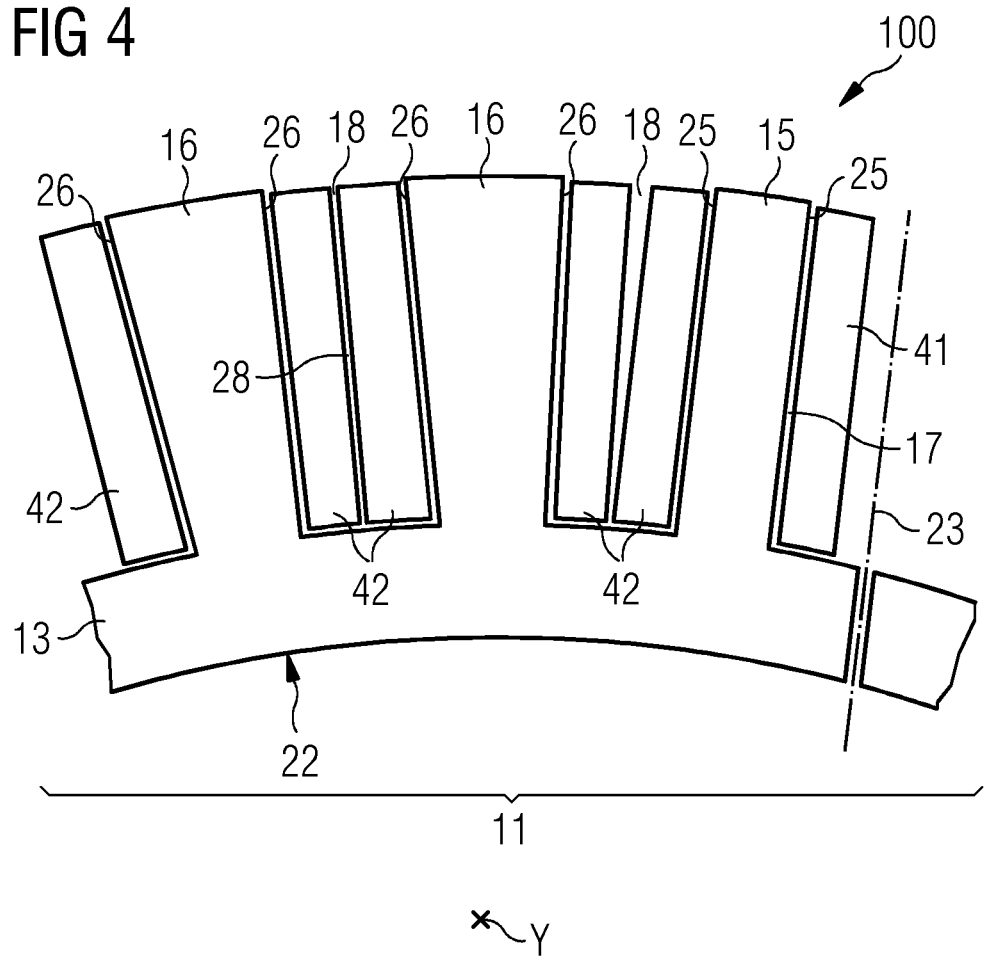

ELECTRICAL MACHINE WITH HYBRID TOOTH DESIGN

CROSS-REFERENCE TO RELATED APPLICATIONS

This application claims priority to European Application No. 18203383.7, having a filing date of Oct. 30, 2018, the entire contents of which are hereby incorporated by reference.

FIELD OF TECHNOLOGY

The following invention relates to an electrical machine having a stator or a rotor with a segmented geometry, i.e. a stator or a rotor including a plurality of stator segments circumferentially joined together.

BACKGROUND

In large electrical machines, segmentation of the stator and/or the rotor structure is required to ease manufacturing and transportation. This is in particular required for stators or rotors where a winding is provided. Due to manufacturing tolerances and limitations, tolerance circumferential gaps are typically designed between segments.

The segment circumferential gaps often lead to issues with undesirable harmonics in the torque and output power of the electrical machine, which can lead to high levels of vibration and acoustic noise as well as losses and complicated control. It is therefore important to control the shape and dimensions of the circumferential gaps in order to minimize the detrimental effect on the performance.

For electrical machines with half teeth at the circumferential ends of the segments (typically integral slot electrical machines with distributed windings), the segment circumferential gaps can be controlled in shape and dimensions by conveniently shaping and dimensioning the half teeth. This has no detrimental effects on the area of slot used for housing the copper windings and therefore the torque and output power of the electrical machine is not affected.

For electrical machines where a half slot is present at each circumferential end of a segment (typically fractional slot machines with concentrated windings), the slot cannot be modified, for example by decreasing them in width, as this would reduce the area for the windings. A reduction in winding area would increase the resistance in this particular coil and therefore increase the loss. By having an imbalance in losses between the coils, a hot spot would be expected to form in the circumferential end coil, thus limiting the operating point of the whole machine from a thermal perspective.

SUMMARY

An aspect relates to a new segment design, for controlling the shape and dimensions of the circumferential gaps in segmented stators or rotors having half slots at the circumferential ends of the segments, in order to minimize the detrimental effects above described.

According to embodiments of the invention, it is provided a segment for the stator or the rotor of an electrical machine including a segment body circumferentially extending about a longitudinal axis of the stator segment between two circumferential ends. The segment body includes:

a plurality of teeth protruding according to a radial direction orthogonal to the longitudinal axis, each tooth circumferentially extending between two respective side faces, the plurality of teeth being circumferentially distributed between two end teeth of the plurality of teeth, the plurality of teeth comprising at least one intermediate tooth circumferentially comprised between the end teeth, a plurality of slots, circumferentially interposed between the teeth of the stator, the plurality of slots being circumferentially distributed between two end slots, each end slot being circumferentially comprised between a respective end tooth and a respective circumferential end, the plurality of slots comprising a plurality of intermediate slots circumferentially comprised between the two end slots, wherein the side faces of the two end teeth are inclined with respect to each other or parallel to each other and the side faces of the at least one intermediate tooth are respectively parallel to each other or inclined with respect to each other.

The above described segment may be advantageously integrated in a segmented stator or rotor of an electrical machine, either generator or motor. For example, the above described segment may be advantageously integrated in the stator of an electrical generator for a wind turbine.

According to embodiments of the present invention, a mixture of tooth designs combines the advantages of both designs in order to reduce the torque and power harmonics induced by the addition of a required segment tolerance circumferential gap, without modifying the half slot is present at each circumferential end of a segment.

According to one embodiment of the invention, the side faces of the two end teeth are inclined with respect to each other and the side faces of the at least one intermediate tooth are parallel to each other. In particular, the side faces of the two end teeth may be radially oriented with respect to the longitudinal axis.

In a circumferential intermediate region of the segment the intermediate teeth having side faces parallel to each other (parallel tooth geometry) defines slots having a lower copper fill factor. This allows a reduction in the end winding length afforded by utilizing an easier coil insertion procedure, i.e. the coil does not have to be deformed to pass over the wider tooth top, as would be the case for a parallel slot configuration At the circumferentially end, instead a parallel slot design geometry is provided which offer a good slot fill factor, which is particularly advantageous for machines with large conductor sizes. The use of parallel slots further allows achieving a torque ripple reduction.

According to another possible embodiment of the invention, the side faces of the two end teeth are parallel to each other and the side faces of the at least one intermediate tooth are inclined with respect to each other. In particular, the side faces of the at least one intermediate tooth may be radially oriented with respect to the longitudinal axis.

Also, in this embodiment, a mixture of tooth designs combines the advantages of both designs in order to reduce the torque and power harmonics induced by the addition of a required segment tolerance gap, as above specified with reference to the previously described embodiment.

According to embodiments of the invention, the segment comprises a coil winding arranged in the segment body, the coil winding including at least two side coils respectively housed in the end slots. The coil winding may be a double-layer winding including two coils in each of the intermediate slots. In particular, the coil winding may be a coil concentrated winding or a double-layer coil distributed winding.

The aspects defined above and further aspects of embodiments of the present invention are apparent from the examples of embodiment to be described hereinafter and are explained with reference to the examples of embodiment. The embodiments will be described in more detail hereinafter with reference to examples of embodiments but to which the invention is not limited.

BRIEF DESCRIPTION

Some of the embodiments will be described in detail, with reference to the following figures, wherein like designations denote like members, wherein:

FIG. 4 shows a partial cross section of a second embodiment of the electrical generator of FIG. 2.

DETAILED DESCRIPTION

Figure 1:
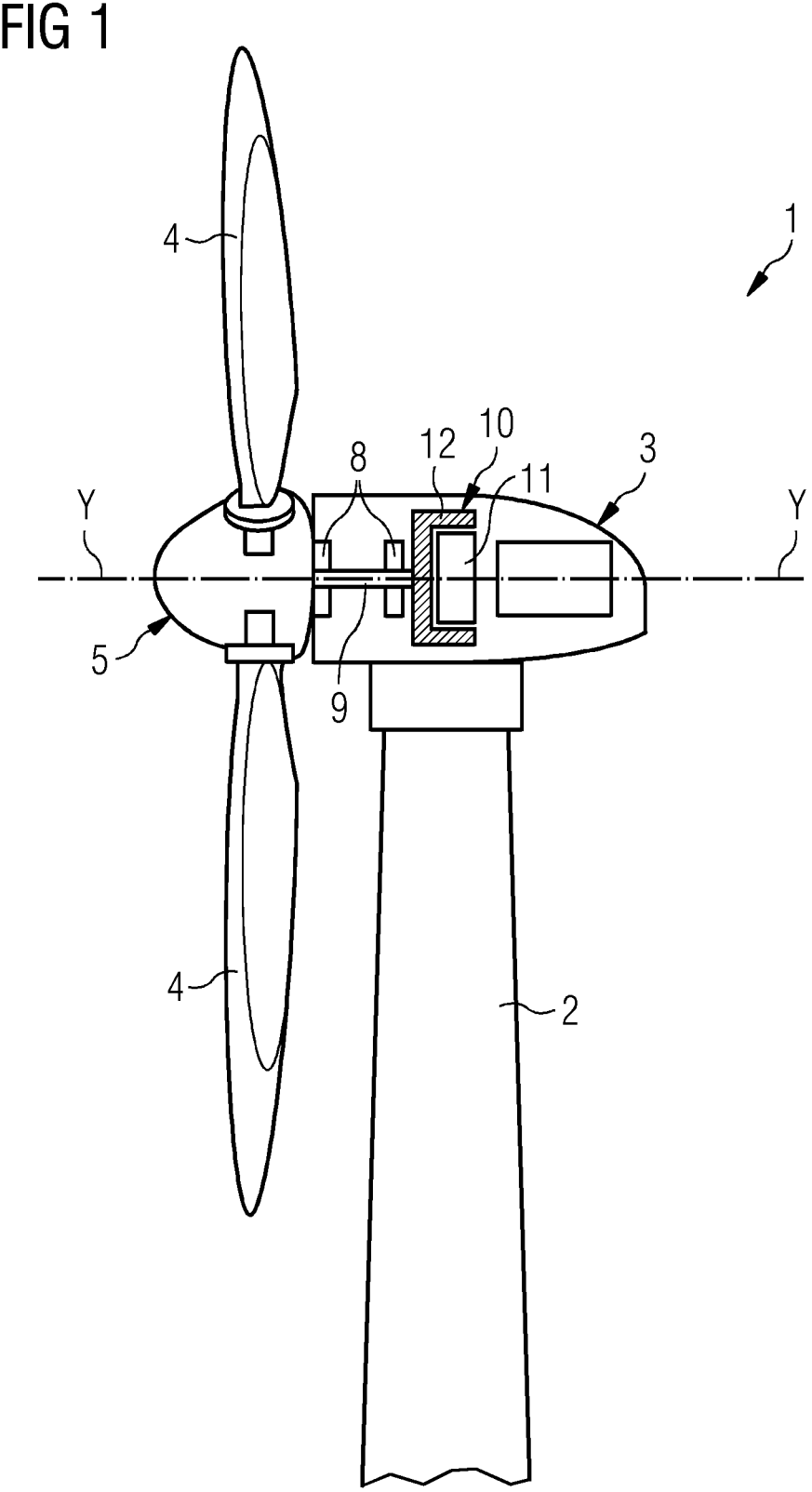
FIG. 1 shows a schematic section of a wind turbine including an electrical generator with a stator geometry according to embodiments of the present invention.

The illustrations in the drawings are schematic. It is noted that in different figures, similar or identical elements are provided with the same reference signs.

FIG. 1 shows a wind turbine 1 according to embodiments of the invention. The wind turbine 1 comprises a tower 2, which is mounted on a non-depicted foundation. A nacelle 3 is arranged on top of the tower 2.

The wind turbine 1 further comprises a wind rotor 5 having two, three or more blades 4 (in the perspective of FIG. 1 only two blades 4 are visible). The wind rotor 5 is rotatable around a rotational axis Y. When not differently specified, the terms axial, radial and circumferential in the following are made with reference to the rotational axis Y.

The blades 4 extend radially with respect to the rotational axis Y.

The wind turbine 1 comprises a concentrated winding electrical generator 10.

The wind rotor 5 is rotationally coupled with the electrical generator 10 by means of a rotatable main shaft 9.

According to other possible embodiments of the present invention (not represented in the attached figures), the wind rotor 5 is rotationally coupled directly with the electrical generator 10 (direct-drive generator configuration).

A schematically depicted bearing assembly 8 is provided in order to hold in place the rotor 5. The rotatable main shaft 9 extends along the rotational axis Y. The permanent magnet electrical generator 10 includes a stator 11 and a rotor 12. The rotor 12 is radially external to the stator 11 and is rotatable with respect to the stator 11 about the rotational axis Y. According to other embodiments of the present invention (not shown) the rotor is radially internal to the stator 11.

According to other possible embodiments of the present invention (not represented in the attached figures), embodiments of the present invention can be applied to any electrical generator or motor which has concentrated winding topology, for example geared drive-trains or electrical machine of the synchronous or asynchronous types.

According to other possible embodiments of the present invention (not represented in the attached figures), embodiments of the present invention can be applied to any electrical generator or motor which has a double-layer coil distributed winding.

Figure 2:
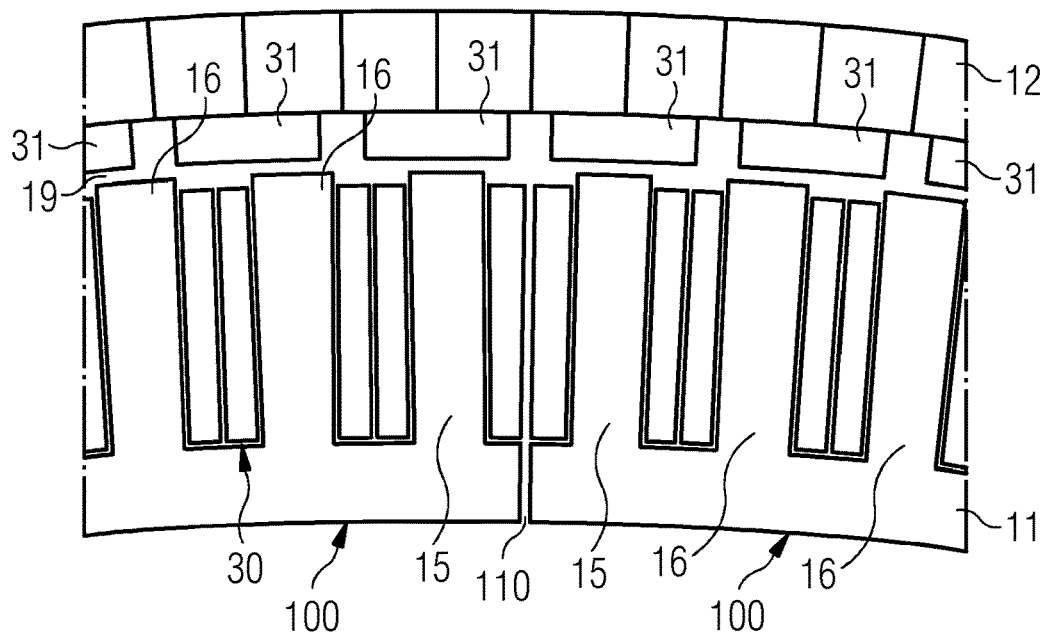
FIG. 2 shows a partial cross section of an electrical generator in accordance with embodiments of the present invention.

FIG. 2 shows a partial schematic view of a cross section, orthogonal to the rotational axis Y, of the electrical generator 10 with radially internal stator 11 and the radial external rotor 12. The electrical generator 10 includes a circumferential air gap 19, radially interposed between the stator 11 and the rotor 12. The rotor 12 includes a plurality of circumferentially distributed permanent magnets 31. The circumferential air gap 19 is radially interposed between the permanent magnets 31 and the stator 11.

The stator 11 includes a plurality of circumferential segments 100, which are circumferentially joined together in such a way that a circumferential gap 110 is interposed between two circumferentially adjacent stator segments 100. The stator 11 has a toothed structure, as described in the following, for housing a coil winding 30 arranged in each of the stator segments 100.

According to other possible embodiments of the present invention (not represented in the attached figures), embodiments of the present invention and the description which follows is applied to a rotor of an electrical machine.

Figure 3:
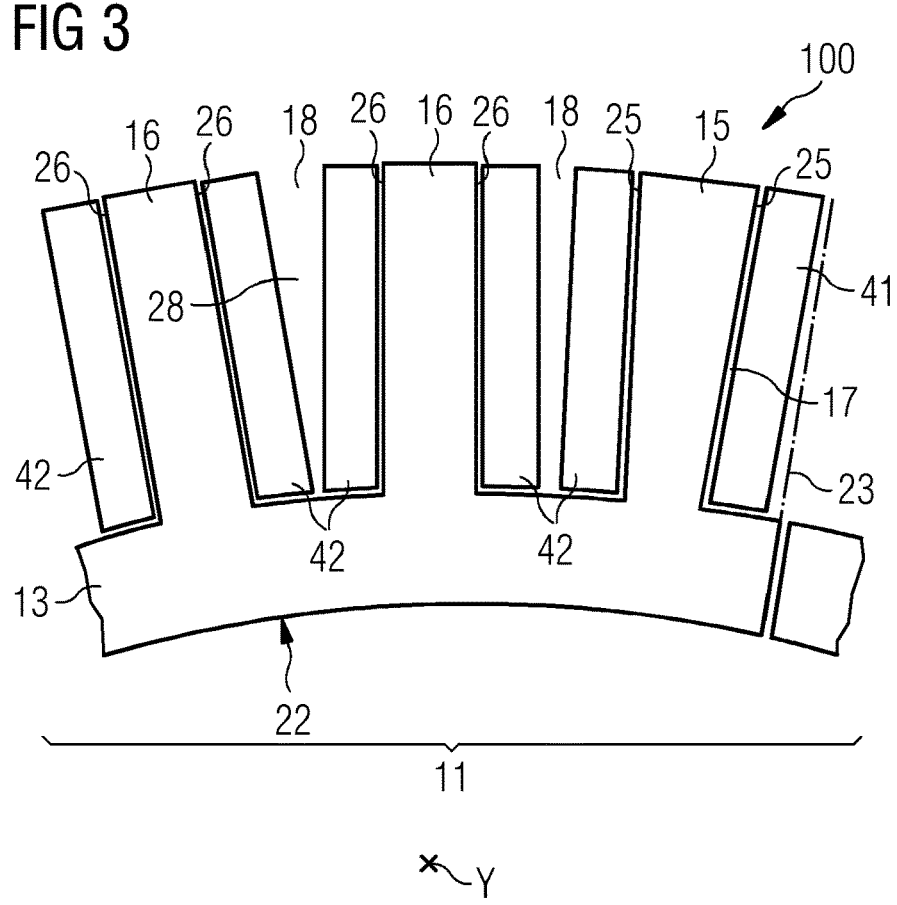
FIG. 3 shows a partial cross section of a first embodiment of the electrical generator of FIG. 2.

With reference to FIGS. 3 and 4, each segment 100 includes a segment body 22 circumferentially extending about the longitudinal axis Y between two circumferential ends 23.

The segment body 22 includes a yoke 13, a plurality of teeth 15, 16 and a plurality of slots 17, 18.

Each tooth 15, 16 protrudes from the yoke 13 according to a radial direction orthogonal to the longitudinal axis Y. The plurality of teeth 15, 16 is circumferentially distributed between two end teeth 15 of the plurality of teeth 15, 16. Each end tooth 15 circumferentially extends between two respective side faces 25. The plurality of teeth 15, 16 comprises at least one intermediate tooth 16 (two intermediate teeth 16 are shown in FIGS. 3 and 4) circumferentially comprised between the end teeth 15. Each intermediate tooth 16 circumferentially extends between two respective side faces 26.

The plurality of slots 17, 18 are circumferentially interposed between the teeth 15, 16 and circumferentially distributed between two end slots 17. Each end slot 17 is circumferentially comprised between a respective end tooth 15 and a respective circumferential end 23 of the segment body 22. The plurality of slots 17, 18 comprise a plurality of intermediate slots 18 (two complete intermediate slot 18 are shown in FIGS. 3 and 4) circumferentially comprised between the two end slots 17.

The coil winding 30 is a double-layer winding including two side coils 41 respectively housed in the end slots 17 and two coils 42 in each of the intermediate slots 18. Each of the side coils 41 and of the coils 42 extends radially from the yoke towards the radial external end of the respective slot 17, 18, i.e. towards the circumferential air gap 19.

According to possible embodiments of the present invention, the coil winding 30 may by a coil concentrated winding or a double-layer coil distributed winding.

With reference to the embodiment of FIG. 3, the two side faces 25 of the two end teeth 15 are radially oriented with respect to each other and the two side faces 26 of each intermediate tooth 16 are parallel to each other.

According to other embodiments of the present invention, the two side faces 25 of the two end teeth 15 are inclined with respect to each other.

According to the embodiment of FIG. 3, the intermediate slots 18 have a lower copper fill factor because a V-shaped gap 28 is provided between the two coils 42 housed in each intermediate slot 18. This allows a reduction in the end winding length afforded by utilizing an easier coil insertion procedure, i.e. the coil does not have to be deformed to pass over the wider tooth top.

At the circumferentially end, instead a parallel slot design geometry is provided for the end slot 17, i.e. the side faces 25 of the end teeth 15 are parallel to the circumferential end 23 of the segment 100, thus offering an improved good slot fill factor, which is particularly advantageous for machines with large conductor sizes. The use of parallel slots further allows achieving a torque ripple reduction.

With reference to the embodiment of FIG. 4, the two side faces 25 of the two end teeth 15 are parallel to each other and the two side faces 26 of each intermediate tooth 16 are radially oriented with respect to each other.

According to other embodiments of the present invention, the two side faces 26 of each intermediate tooth 16 are inclined with respect to each other.

According to the embodiment of FIG. 4, the intermediate slots 18 exhibits a parallel slot design geometry, which is characterized by a higher copper fill factor than in the embodiment of FIG. 3, because a smaller and constant gap 28 is provided between the two coils 42 housed in each intermediate slot 18. This offers an improved good slot fill factor, which is particularly advantageous for machines with large conductor sizes. The use of a parallel slot geometry further allows achieving a torque ripple reduction.

At the circumferentially end, instead a parallel tooth design geometry is provided for the end teeth 15, thus reducing the copper fill factor, with a consequent reduction in end winding length afforded by utilizing an easier coil insertion procedure, i.e. the coil does not have to be deformed to pass over the wider tooth top, as it is the case in a parallel slot design geometry.

In both embodiments, a mixture of tooth designs combines the advantages of both designs in order to reduce the torque and power harmonics induced by the addition of a required segment tolerance gap.

Further, the dimension and shape of the gap can be efficiently controlled by efficiently combining the parallel slot design geometry with the parallel tooth design geometry, as described above.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A stator segment for a stator or a rotor of an electrical machine including a plurality of segments, wherein each segment includes a segment body circumferentially extending about a rotational axis of the stator or the rotor between two circumferential ends, the segment body comprising:
a plurality of teeth protruding according to a radial direction orthogonal to the rotational axis, each tooth circumferentially extending between two respective side faces, the plurality of teeth being circumferentially distributed between two end teeth of the plurality of teeth, the plurality of teeth comprising at least one intermediate tooth circumferentially comprised between the two end teeth; and
a plurality of slots, circumferentially interposed between the plurality of teeth of the stator, the plurality of slots being circumferentially distributed between two end slots, each end slot being circumferentially comprised between a respective end tooth and a respective circumferential end, the plurality of slots comprising a plurality of intermediate slots circumferentially comprised between the two end slots;
wherein each segment comprises a coil winding arranged in the segment body, the coil winding including at least two side coils respectively housed in the end slots;
wherein the plurality of segments are circumferentially joined together at two respective circumferential ends in such a way that a required segment tolerance circumferential gap is interposed between two circumferentially adjacent segments to reduce a torque and power harmonics induced by an addition of the required segment tolerance circumferential gap;
wherein side faces of the two end teeth are inclined with respect to each other and the side faces of each intermediate tooth are parallel to each other or the two side faces of the two end teeth are parallel to each other and the side faces of each intermediate tooth are inclined with respect to each other.

2. The segment as claimed in claim 1, wherein the side faces of the two end teeth are radially oriented or parallel to each other and the side faces of each intermediate tooth are respectively parallel to each other or radially oriented.

3. The segment as claimed in claim 1, wherein the coil winding is a double-layer winding including two coils in each of the intermediate slots.

4. The segment as claimed in claim 1, wherein the coil winding is a coil concentrated winding or a double-layer coil distributed winding.

5. A wind turbine including an electrical generator including the stator or rotor as claimed in claim 1.

* * * * *